(12) United States Patent
Thomaier et al.

(10) Patent No.: US 12,455,448 B2
(45) Date of Patent: Oct. 28, 2025

(54) METHOD FOR VISUALIZING OPTICAL INFORMATION

(71) Applicant: Dr. Ing. h.c. F. Porsche Aktiengesellschaft, Stuttgart (DE)

(72) Inventors: Daniel Thomaier, Vaihingen/Enz (DE); Andrian Riedel, Gerlingen (DE); Fabian Klausmann, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 18/377,013

(22) Filed: Oct. 5, 2023

(65) Prior Publication Data

US 2024/0118542 A1 Apr. 11, 2024

(51) Int. Cl.
| | |
|---|---|
| *G02B 27/01* | (2006.01) |
| *B60K 35/10* | (2024.01) |
| *B60K 35/22* | (2024.01) |
| *B60K 35/232* | (2024.01) |
| *B60K 35/81* | (2024.01) |
| *B60K 37/00* | (2006.01) |
| *B60K 35/60* | (2024.01) |
| *B60K 35/90* | (2024.01) |

(52) U.S. Cl.
CPC .......... *G02B 27/0101* (2013.01); *B60K 35/10* (2024.01); *B60K 35/22* (2024.01); *B60K 35/232* (2024.01); *B60K 35/81* (2024.01); *B60K 37/00* (2013.01); *G02B 27/0179* (2013.01); *B60K 35/60* (2024.01); *B60K 35/90* (2024.01); *G02B 2027/0141* (2013.01); *G02B 2027/0183* (2013.01)

(58) Field of Classification Search
None
See application file for complete search history.

(56) References Cited

U.S. PATENT DOCUMENTS

| | | | |
|---|---|---|---|
| 11,307,047 B2 | 4/2022 | Bagschik et al. | |
| 2017/0254659 A1* | 9/2017 | Fukumoto | B60K 35/10 |

FOREIGN PATENT DOCUMENTS

| | | |
|---|---|---|
| DE | 19813300 | 10/1999 |
| DE | 102013021150 | 6/2015 |
| DE | 102015205868 | 10/2016 |
| DE | 102015109027 | 12/2016 |
| DE | 102019003269 | 5/2020 |

OTHER PUBLICATIONS

German Search Report dated Apr. 25, 2023.

* cited by examiner

*Primary Examiner* — Nicholas J Lee
(74) *Attorney, Agent, or Firm* — Gerald E. Hespos; Michael J Porco

(57) ABSTRACT

A method is provided for visualizing optical information in the central field of vision of a driver in such a way that a display (5) in the form of a virtual image is superimposed on a real traffic environment. A position of the display (5) is dynamically variable as a function of a vehicle speed, a steering angle, and a road type. Thus a horizontal and/or vertical spread of a display range (8) between a first maximum value (9) and a second maximum value (10) within which the display (5) can be displayed is varied as a function of speed, steering angle and roadway type.

9 Claims, 2 Drawing Sheets

METHOD FOR VISUALIZING OPTICAL INFORMATION

CROSS REFERENCE TO RELATED APPLICATION

This application claims priority on German Patent Application No 10 2022 125 615.4 filed Oct. 5, 2022, the entire disclosure of which is incorporated herein by reference.

BACKGROUND

Field of the Invention. The invention relates to a method for visualizing optical information in the field of vision of a driver. The invention also relates to a vehicle or helmet having a projection device or a head-up display, and a computer device configured to carry out the method.

Related Art DE 10 2013 021 150 A1 discloses a method and a projection device for displaying optical information in vehicles in the central field of vision of a driver. The projection device is configured so that the projection distance and/or image size and/or image position are dynamically variable. Thus, the virtual image of the presented information perceived by the driver is viewable at a dynamically variable virtual distance relative to the position of the driver's eye and/or a dynamically variable position in the driver's field of vision and/or in a dynamically variable display size. These capabilities are intended to cause the driver less distraction, less stress, and less fatigue.

U.S. Pat. No. 11,307,047 B2 discloses a method for controlling a display of a head-up display device for a motor vehicle in which a stretch of road in front of the motor vehicle is determined in a first step. The content presented by the head-up display device then is shifted according to the particular stretch of road. The method is intended to control the driver's attention or vision, but can be disruptive to the driver under certain circumstances.

DE 198 13 300 A1 discloses a display apparatus with a device for projecting at least one virtual image in front of a windshield of a motor vehicle. A position of this virtual image is variable as a function of at least one driving state parameter.

DE 10 2015 205 868 A1 discloses a method for presenting a quasi-spatial mapping of virtual objects using a display device on a mapping surface. The method includes: representing the objects on the mapping surface in a viewer position-based arrangement, determining a force acting on the head of the viewer depending on at least one state variable of the motor vehicle, and updating the viewer position depending on the force acting on the head of the viewer.

The constantly increasing functions in motor vehicles demand a continuously increasing attention of a driver, preferably without the driver having to turn away from traffic events to look at a display arranged on a dashboard. For this reason, head-up displays are increasingly being used to project a virtual image onto a plane in front of the vehicle. Depending on the technical solution of the head-up display, the projection plane lies a few meters in front of the vehicle and can lead to a certain oscillating effect, especially when driving in corners, where the virtual images are sometimes displayed off the road in the surrounding area, while the driver's vision follows the curvature of the road to fulfill the driving task. As a result of this discrepancy, the content presented via the head-up display is less easily understood.

An object of the invention is to provide a display that overcomes the disadvantages known from the prior art.

SUMMARY OF THE INVENTION

The invention relates to establishing a display range that can be viewed by a driver of a vehicle. More particularly, the display range is bounded by a first maximum value and a second maximum value, for example, left and right maximum values. An optical piece of information in the form of a virtual image can be displayed to a driver within this range. A spread of the display range between the two maximum values can be varied in a speed-dependent manner. Thus, for example, a smaller spread, i.e. a smaller distance between the first and second maximum values, can be established at lower speeds, and a greater spread, i.e. a greater distance between the first and second maximum values, can be established at higher speeds. This results in the display shift being inactive or barely active during lower speed driving or parking maneuvers in an urban environment where the display changes can be perceived as disruptive. In higher speed ranges and with stronger turning radii, the display shift can be more pronounced. This results in the driver being able to read the larger display better and faster, thereby increasing driving comfort and safety due to reduced eye avoidance from the roadway. Thus, the method of the invention includes visualizing optical information in a vehicle, in a helmet or in a pair of glasses so that a virtual image display is superimposed in the central field of vision of the driver, and the display is dynamically variable depending on a real traffic environment, vehicle speed, steering angle, road type, or possibly other input variables that may be from vehicle sensory systems/driver assistance systems. Accordingly, the invention provides a speed-based horizontal and/or vertical spread of a display range between a first maximum value and a second maximum value within which a virtual image can be displayed. This approach can minimize a discrepancy between the traffic-based direction of vision of the driver and the position of the display, as in the prior art, because when driving a curve, the virtual image with the visual information can be kept on the road and thus within the normal and traffic-based angle of view of the driver and does not occur off the road, for example. The method according to the invention thus increases both comfort for the driver and road safety.

The method can be used by varying a horizontal spread of the display range between first and second maximum values in a speed-dependent manner or a vertical spread of the display range between first and second maximum values in a speed-dependent manner. Varying the vertical spread is particularly advantageous when driving over bumps or in case of generally uneven topology or topography.

In one embodiment, the spread of the display range may be deactivated below a predefined first vehicle speed v1. Thus, a comparatively large steering angle can occur if the vehicle is in a parking or maneuvering operation, and a maximum range of the display can occur. However, in this case, the vehicle can carry out a variety of short-term back-and-forth movements and could cause a constant jumping back-and-forth of the display that would be more confusing for a driver than informative. Accordingly, the spread of the display range may be deactivated below the predefined first vehicle speed v1 or the two maximum values may be set to 0%, so that the display of the virtual image is not deflected independently of the steering angle.

In some embodiments, the predefined first vehicle speed may be set to $v1 \geq 0$ km/h or $v1 \leq 20$ km/h. At such vehicle speeds, the vehicle is typically in a parking place hunting or maneuvering mode, where increased attention to the environment of the vehicle is required. In this case, a back-and-forth shifting of the display due to steering angle clearance would distract the driver, and driving safety is increased by disabling the deflection of the display below the predefined first vehicle speed v1.

In some embodiments, the spread of the display range above the predefined first vehicle speed v1 is increased linearly up to a predefined second vehicle speed v2. In this case, the two maximum values thus extend up and down towards the left or right, with a horizontal expansion and/or vertical expansion. This allows the display projected in the form of a virtual image in front of the vehicle or the helmet to be kept on a roadway at all times, thereby providing the driver with relevant information via the display while not diverting attention from traffic. The predefined second vehicle speed v2 can be less than or equal to 60 km/h. However, in general, v2 is greater than v1. Even more predefined vehicle speeds can be employed to further refine the deflection behavior of the display. The stated values are exemplary and can be adjusted to apply a shift that is not detectable as far as possible by the driver. Country-specific adjustments also are conceivable.

The spread above the predefined second vehicle speed v2 may remain the same, i.e. the first and second maximum values reached thus far remain the same. Such a limitation is useful, because further increasing the spread of the display range due to an increasing vehicle speed would lead to a greater deflection of the display and could encompass areas adjacent to the roadway, thereby impairing the driver's concentration on traffic events. The maximum values are specified by the width and/or height of a projection region, wherein basically an "unrestricted" shift can also be useful to always keep the display centered to the roadway. If no maximum values were defined, the contents could slide out of the projection range and would be cut off or no longer visible.

In some embodiments, a spread of the display range above the predefined second vehicle speed v2 will be disabled as a function of a road type. For example, if a navigation system detects that the vehicle or the driver is moving on an elongated, straight highway, the spread of the display range can be deactivated so that a deflection of the display can be prevented. This can ensure that the display always remains on the substantially straight highway and that the driver is not distracted by a display shift in case of small steering movements/lane changes. In particular, no change in the driver's direction of vision is required between the traffic event and the display.

Some embodiments may have a horizontal and/or vertical shift of the position of the display between the first maximum value and the second maximum value at constant shift speed, e.g. independently of vehicle speed and/or a speed of changes of a steering angle. This can help avoid a jerking or jumping of the display that is not helpful to the driver of the vehicle and/or is possibly uncomfortable to the driver of the vehicle.

The invention also relates a vehicle, a helmet or eyewear with a projection device, in particular a head-up display, and a computer configured to carry out the method described above. The projection device causes relevant information, e.g. maximum speed allowed, to be projected onto an image plane in front of the vehicle or in front of the driver. This display of information is kept within the roadway, thereby avoiding a deflection of the driver's direction of vision from the roadway to the display. Accordingly, inattentiveness can be avoided. The projection device can be configured as a windshield head-up display or as a pair of AR glasses.

Further important features and advantages of the invention follow from the claims, the drawings, and the description of the figures in relation to the drawings.

Features mentioned above and those discussed below can be used in the respectively specified combination, in other combinations or on their own, without departing from the scope of the invention. The components described above and referred to below of a higher-level unit, e.g. a device, an apparatus, or an assembly, that are designated separately, can constitute separate parts or components of this unit, or integral regions or sections of this unit, even if shown differently in the drawings.

Examples of the invention are set forth in the drawings and are explained below, with identical reference numbers referring to identical, similar, or functionally identical components.

DETAILED DESCRIPTION

Figure 1:
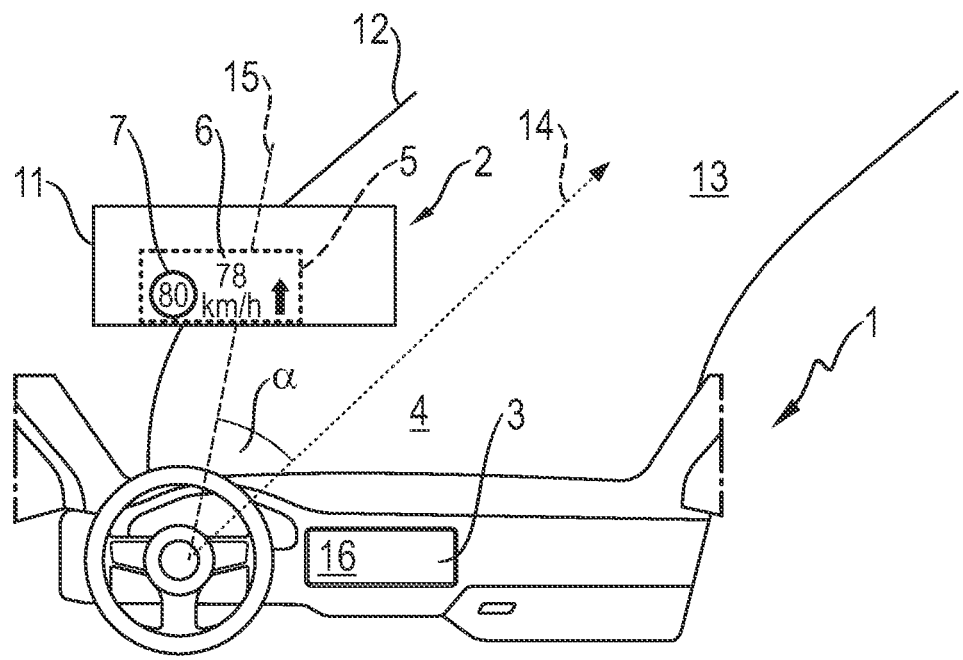
FIG. 1 is an interior view of a vehicle according to the invention with a view onto a roadway in front of the vehicle.
Figure 2:
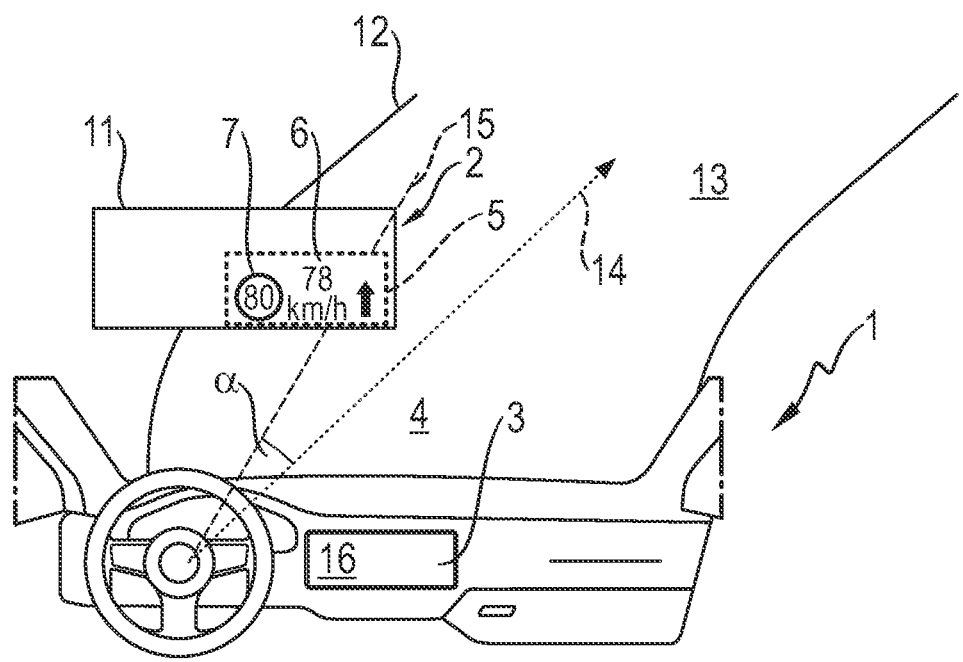
FIG. 2 is a representation as in FIG. 1, but with the display shifted.

A vehicle according to an embodiment is identified by the numeral 1 in FIGS. 1 and 2. The vehicle 1 comprises: a projection device configured to produce a heads-up display 2; a computer device 3 configured to carry out the method described herein; and a windshield 4. A "computer device" is understood in connection with the invention to mean, for example, a machine or an electronic circuit. In particular, a processor can be a master processor (central processing unit (CPU)), a microprocessor, or a microcontroller, for example an application-specific integrated circuit or a digital signal processor, optionally in combination with a memory unit for storing program instructions, etc. A processor also can mean a virtualized processor, a virtual machine, or a soft CPU. For example, it can also be a programmable processor equipped with configuration steps for carrying out the method or configured with configuration steps in such a way that the programmable processor realizes the features of the method, the system, or other aspects and/or partial aspects of the invention. In particular, the processor can include highly parallelized computing units and high-performance graphics modules. In connection with the invention, a "memory unit" may be a volatile memory in the form of a working memory (random access memory, RAM), or a permanent memory such as a hard drive or a data carrier or, for example, a replaceable memory module. However, the memory unit can also be a cloud-based storage solution One embodiment of the method produces a display 5 of information and superimposes the display 5 on a real traffic environment as a virtual image. The display 5 in the embodiment of FIGS. 1 and 2 has a current vehicle speed 6 and a maximum permissible speed 7 superimposed on a real traffic environment in the central field of vision of a driver to form the virtual image. A position of the display 5 can be changed as a function of a vehicle speed, a steering angle, a road type, or further input parameters. According to the method, there is a speed-based spread of the display range 8 between a first maximum value 9 and a second maximum value 10 (cf. FIGS. 3 and 4).

The display 5 can be shifted or displayed within the horizontal spread of the display range 8, i.e. between the first maximum value 9 and the second maximum value 10. In certain situations, e.g., a content changeover in the maximum position, the display 5 can extend to the right above the second maximum value 10 or to the left above the first maximum value 9 or the content may not necessarily be shown in full. A horizontal shift of the display 5 is shown in FIGS. 3 and 4, and a vertical shift can occur in the same manner, in particular when traversing bumps.

The solid line 11 in FIG. 1 represents an image range 11 that could exist for the head-up display 2 without the method of the invention. FIG. 1 shows that a display 5 integrated in the image range 11 projects beyond a left edge 12 of a roadway 13 and deviates greatly from a direction of vision 14 of the driver who is following the roadway 13. Thus, there is a discrepancy between the position of the display 5 and the traffic-based direction of vision 14 of the driver on the roadway 13, and this discrepancy can lead to a pendulum effect when the driver alternately follows the direction of vision 14 of the roadway 13 and the display 5.

FIG. 2, on the other hand, shows that in accordance with the method of the invention, the display 5 is shifted to the right and thus into the roadway 13 and in the direction of the driver's direction of vision 14. Thus, the oscillating effect can be at least minimized, preferably even eliminated, and an angle α between the direction of vision 15 and the direction of vision 14 is reduced.

Figure 3:
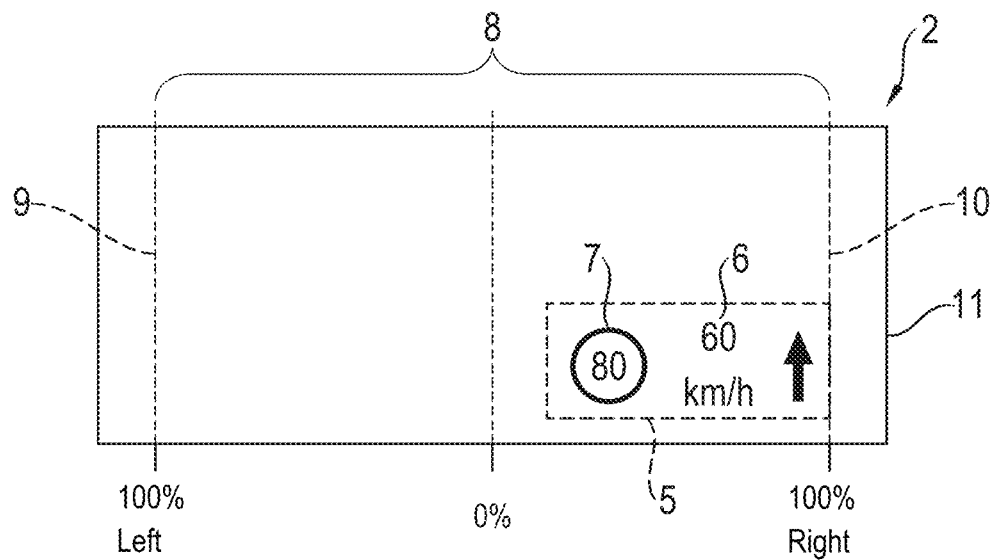
FIG. 3 a spread of a display range having a first and second maximum value with a vehicle driving 60 km/h.
Figure 4:
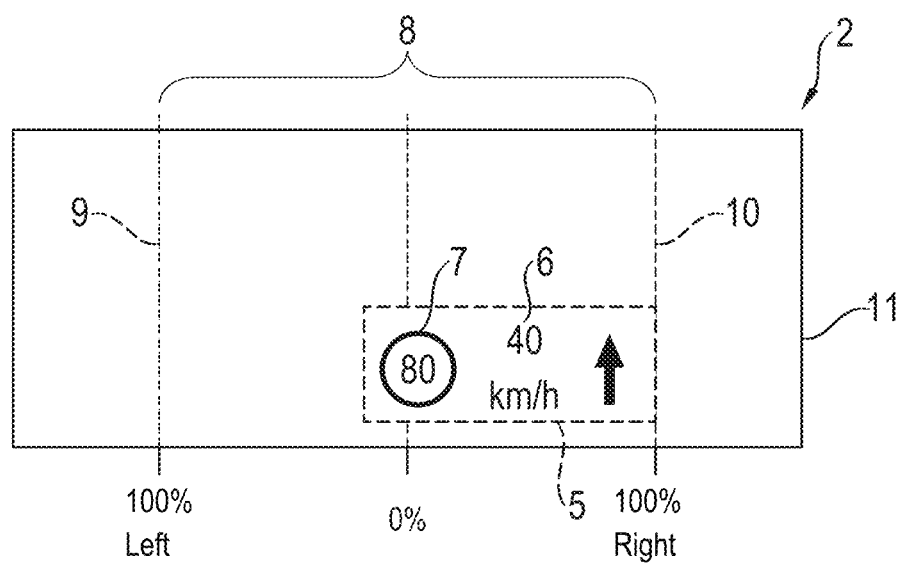
FIG. 4 is similar to FIG. 3, but with a smaller spread of the display range, i.e. with a lower possible horizontal deflection of a display with a vehicle driving 40 km/h.

FIGS. 3 and 4 show that the spread of the display range 8 can be deactivated below a predefined first vehicle speed v1. This predefined first vehicle speed v1 of some embodiments is ≥0 km/h and ≤20 km/h.

Deactivating the spread of the display range 8, i.e. reducing the first maximum value 9 (left maximum value) and the second maximum value 10 (right maximum value) to 0%, causes the display 5 to be deflected neither to the left nor to the right.

If, for example, the vehicle speed v increases from the first vehicle speed v1 to a higher predefined second vehicle speed v2, then the spread of the display range 8 is enlarged, for example to the value shown in FIG. 3. For example, the predefined second vehicle speed v2 can be set to be less than or equal to 60 km/h (cf. FIG. 3), preferably less than or equal to 40 km/h (cf. FIG. 4). As the vehicle speed v increases and/or above a certain steering angle, the spread of the display range 8 thus increases, i.e. the distance between the two maximum values 9, 10, so that the display 5 can be shifted more in a horizontal direction. Conversely, during braking, the contents are shifted in the opposite direction.

If the vehicle speed v continues to increase to a speed that exceeds the predefined second vehicle speed v2, then the spread of the display range 8 will no longer increase or enlarge, but rather will retain its first maximum value 9 and its second maximum value 10. The maximum values 9, 10 exist because the possible image range 11 is limited. From the second vehicle speed v2, the maximum is utilized.

The spread of the display range 8 above the predefined second vehicle speed v2 can be deactivated as a function of the road type. For example, if the vehicle 1 is traveling on a highway, no spread of the display range 8 is required, such that the first maximum value 9 and the second maximum value 10 are at 0%. The determination of the road type or the street type can be taken from a navigation system 16 and/or a driver assistance system.

A further embodiment accounts for the likelihood that the roadway 13 not only extends in a straight direction but also in a curved manner. Thus, a horizontal shift of the position of the display 5 can occur between the first maximum value 9 and the second maximum value 10, i.e. within the spread of the display range 8 between left and right, at a constant speed and independently of the vehicle speed or a speed of changes of the steering angle. In particular, this can reliably avoid jerking or jumping of the display 5. This avoidance of jerking or jumping of the display 5 increases driving safety and enhances driving comfort of the driver. In addition, visual agitation can also be reduced or even avoided, and a shift of the display 5 is not perceived or at least is not perceived as disruptive by the driver.

The vehicle 1 and the method of the invention thus improve driving comfort and driving safety.

The invention claimed is:

1. A method for visualizing optical information in a field of vision of a driver of a vehicle (1), the field of vision being in front of the vehicle relative to a forward driving direction of the vehicle (1), the method comprising:
   superimposing a display (5) as a virtual image on a real traffic environment, the display (5) being superimposed within a display range (8) that has a horizontal spread extending in a transverse direction of the vehicle (1) relative to the forward travel direction of the vehicle (1) and a vertical spread extending transverse to both the horizontal spread and the forward direction of travel of the vehicle (1);
   determining at least one of a vehicle speed, a steering angle, and a road type;
   dynamically varying a position of the display (5) within the display range (8) as a function of at least one of the vehicle speed, the steering angle, and the road type; and
   changing at least one of the horizontal spread and the vertical spread of the display range (8) of the display (5) between a first maximum value (9) and a second maximum value (10) within which the display (5) can be displayed based on at least one of the vehicle speed, the steering angle, and the road type.

2. The method of claim 1, further comprising deactivating the changing of the spread (8) below a predefined first vehicle speed $v_1$.

3. The method of claim 2, wherein the predefined first vehicle speed is set to $v_1 \geq 0$ km/h.

4. The method of claim 2, wherein the changing of at least one of a horizontal and vertical spread of the display range (8) of the display (5) between the first maximum value (9) and the second maximum value (10) comprises increasing at least one of the horizontal spread and the vertical spread of the display range (8) of the display (5) linearly between the predefined first vehicle speed $v_1$ up to a predefined second vehicle speed $v_2$.

5. The method of claim 4, wherein the predefined second vehicle speed is set to $v_2 \leq 60$ km/h.

6. The method of claim 4, further comprising maintaining the spread of the display range (8) constant above the predefined second vehicle speed $v_2$.

7. The method of claim 4, further comprising deactivating the spread of the display range (8) above the predefined second vehicle speed $v_2$ as a function of the road type.

8. The method of claim 7, further comprising using at least one of a navigation system (16) and a driver assistance system for determining the road type.

9. A head-up display (2) comprising a computer device (3) configured to carry out the method of claim 1.

* * * * *